Patented Nov. 1, 1932

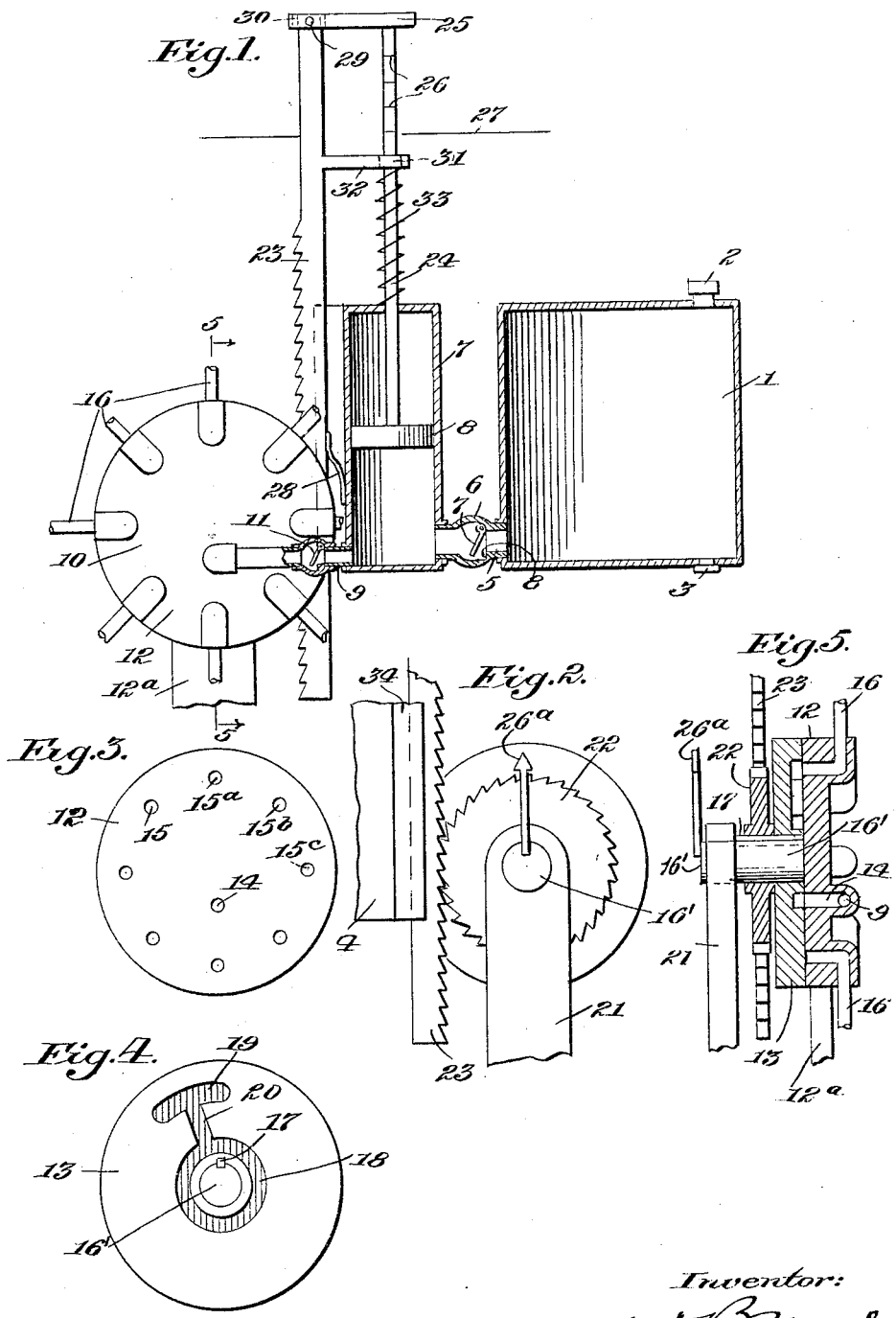

1,886,067

UNITED STATES PATENT OFFICE

HERBERT B. MOSES, OF SAN FRANCISCO, CALIFORNIA, ASSIGNOR TO IRMA H. MOSES

LUBRICATING SYSTEM

Application filed May 15, 1928. Serial No. 277,906.

This invention relates to lubricating devices of such type that a number of parts can be easily and conveniently lubricated by a simple movement of an actuating means.

An object of the invention is the provision of a force feed device operative at will or otherwise to deliver lubricant to a number of different bearings or journals or other parts.

Another object is the provision of means to distribute the lubricant serially to the various parts which it is necessary to lubricate from time to time.

Another object is to indicate if all the parts to receive lubricant have or have not been lubricated on operation of the device.

Another object of the invention is the provision of means to indicate when a particular part does not receive the lubricant as it should.

Another object of the invention is the provision of means to lubricate a number of parts and either to give assurance that all such parts have been lubricated or to indicate which part has not been lubricated.

Another object is the provision of means whereby a very simple movement of the operator will effect lubrication of all the parts requiring lubrication, or which will indicate in a simple manner which part did not receive the required lubrication.

Another object of the invention is the location of the actuating means so as to be operable from any convenient point, say the driver's seat of an automobile, if the lubricator is applied to an automobile, although other convenient points may be chosen if so desired.

Another object of the invention is the provision of a point convenient for observation of an index which will indicate the particular part receiving the lubricant at the particular moment.

Another object is the provision at a point suitable for convenient observation of an index which will indicate, in conjunction with the operation of the device itself, whether or not the various parts receive the lubricant and which will indicate which part has not received or does not receive the lubricant and why, so that the workman seeking to repair the device may know just which part is at fault and the nature of the fault.

Other objects will be apparent from the description of the invention.

This invention is intended primarily for convenient, easy, quick and certain lubrication of various parts of an automobile in a cleanly manner, but, obviously, it is applicable to other types of devices.

The device in general comprises a source of lubricant, a pump or other force feed means for receiving lubricant therefrom and expelling it, a distributor into which the pump expels the lubricant, connections from the distributor to the various points to be lubricated, and an indicating means to indicate which connection of the distributor is receiving the lubricant at any particular moment so that a leak in the particular line or stopping up thereof may be indicated to the operator.

An embodiment of my invention comprises a container for the lubricant, and a force means such as a hand or foot-actuated plunger (although the operation thereof may be mechanical or automatic) to force the lubricant from the container to a multi-way valve, to each way of which a pipe is connected, and each such pipe leads preferably to a single point to be lubricated. This plunger preferably actuates the multi-way valve to connect one way after another with the lubricant forcing means, so that as the plunger is depressed first one point becomes lubricated, then another point, then another point, and so on. One feature of the invention is that practically only one bearing at a time receives lubricant, so that should any line become plugged up to such an extent that lubricant cannot be forced therethrough, it will be impossible to depress the plunger further, thus indicating the trouble, while a leak in the line great enough to deflect a substantial amount of lubricant from the point to be lubricated will be indicated by greater ease of movement of the plunger. Thus any substantial variation in the ease or difficulty of operating the plunger will not only indicate the existence of a fault in the system, but the index described hereinafter will indicate in which lubrication line the trouble is. The plunger may have a series of marks thereon, each mark corresponding preferably to a single particular lubrication line and to a single particular point to be lubricated, (although, where so desired, any one or more conduits may each supply lubricant to more than one part to be lubricated, as by means of branch conduits leading from the particular conduit) and when the plunger sticks, due to the flow of lubricant being stopped, a mere inspection of the index thereof will show which line is plugged up and needs attention. The sticking of the plunger before it is fully depressed will indicate to the operator that something is wrong with the lubricating system, and the index will indicate in which line the trouble is. A leak in a line sufficient to deflect the major portion of the lubricant away from the point to be lubricated and thus prevent proper lubrication of that point will allow the plunger to move with such ease that a leak will thereby be indicated to the operator, the position of the plunger at which the easier motion starts indicating in which line the trouble is. Thus failure to lubricate any point on operation of the lubricator will be immediately indicated, as will the point failing to receive its lubrication, thus giving notice when and in which line repairs are to be made, and at the same time the device will indicate whether the trouble is due to stopping up of a lubricating line or to a substantial leak therein.

To accomplish these results it is preferred that only one point be fed with lubricant at a time, for greater certainty in determining the existence of a fault and the lubricating line in which it is located, but the end of the lubricating period for any point may and best should overlap very slightly with the beginning of the lubricating period of the next ordinal point in the system; as otherwise the plunger may not pass over the point corresponding to that at which no lubricant flows through the system. The operating means may be wherever is convenient and is preferably a hand or foot operated plunger situated conveniently to the driver's seat, say at the dashboard or floor, so that the driver can conveniently lubricate the automobile at any time even while running the car, but it naturally can be located elsewhere and operated otherwise. The plunger may be retracted to the initial operating position by any means such as a spring which may or may not cause reverse movement of the multi-way valve, or it may remain depressed until operation thereof is desired, when the operator can pull it up before depressing it.

The drawing illustrates an embodiment of my invention in a more or less diagrammatic manner, but it is to be understood that my invention is not to be limited to any particular embodiment except as may be defined in the claims, since certain features of my invention are in the combination and relationship of the various means comprised in my device.

Fig. 1 is a diagrammatic view, partly in section of one embodiment of the invention, showing the relationship of the various features to each other;

Fig. 2 is an elevational view of a part of the device, taken from the rear of Fig. 1;

Fig. 3 is an elevation of a detail of the distributor;

Fig. 4 is an elevation of another detail of the distributor; and

Fig. 5 is a sectional view of the distributor taken on line 5—5 of Fig. 1.

A supply reservoir for the lubricant 1 has a suitable filling opening which may be closed by a plug 2, and it may have a drain opening which may be closed by a plug 3. A pump 4 is connected with the reservoir 1 by means of a conduit 5 in which is located a one-way valve 6 whereby the lubricant may pass from the reservoir to the pump but not in reverse direction. This one-way valve 6 may comprise a suitable pivoted flap 7 which swings to the left on Fig. 1 as lubricant passes from the reservoir to the pump, but rests against the seat 8 to close the connection between the pump and the reservoir whenever there is a tendency for the material to pass from the pump to the reservoir. Any other suitable type of one-way valve may be used.

The pump 4 may comprise a suitable casing 7 to which the conduit 6 may be connected, and a plunger 8 within this casing may be used to cause withdrawal of the lubricant from the reservoir 1 into the pump 4 as the plunger is moved upwardly, and to expel such withdrawn lubricant from within the pump and force it into and through the distributor as the plunger moves downwardly. Another conduit 9 connects the pump 4 with the distributor 10, and in this conduit there is another one-way valve 11 which may or may not be of the same construction as that previously referred to, and which permits of flow of the lubricant from the pump to the distributor and prevents flow in the reverse direction.

The distributor may be of any desired construction and it may consist of two disks 12 and 13 movable one with respect to the other, and the disk 12 may be fixed while the disk 13 may rotate with respect thereto. The disks 12 and 13 may be mounted concentrically so that their adjacent flat faces contact with each other, and the disk 12 may be provided with an opening 14 passing therethrough. The pipe 9, in which is the one-way valve 11 and leading from the pump 4, is attached to the distributor at the opening 14, whereby lubricant may be fed to the distributor. Additional openings 15, 15a, 15b, 15c, etc., of suitable number, pass through the disk 12, and each of these openings is preferably the same distance from that next adjacent thereto and all the same distance from the center of the disk, while the opening 14 is at a different distance from the center. The disk 13 may be fixed to a rotatable shaft 16' to rotate therewith by any suitable means, as a key 17, and this disk is provided with a circular groove or passageway 18 in the inner face thereof and it is preferably at the same distance from the center as the opening 14 in the disk 12. The disk 13 is provided also on the inner face thereof with an arc-shaped groove 19 spaced the same distance from the center of the disk 13 as the openings 15, 15a, 15b, 15c, etc. are spaced from the center of the disk 12, and this groove 19 is of any suitable length, but it is preferred that the arcuate length thereof be just a little greater than the nearest distance between any two next adjacent openings 15, 15a, 15b, etc., when measured along an arc, for a reason to be described later. The grooves 18 and 19 are connected to each other by a groove 20, also on the inner face of the disk 13.

The disk 12 is held in fixed position by any suitable support as 12a, and the disk 13 which is fixed to the shaft 16' rotates when the shaft is rotated so that the lubricant entering the opening 14 from the pipe 9 and then passing through the grooves 18, 20 and 19 consecutively, is distributed from the groove 19 to the various openings 15, 15a, 15b, etc., as the groove 19 passes thereover, the lubricant passing through the openings 15 to the distributing pipes 16 connected thereat which lead each to a point to be lubricated.

The shaft 16' may be journaled in a suitable support 21, and keyed to this shaft along with the disk 13 is the gear wheel 22, so that rotation of the gear 22 will cause a like rotation of the disk 13. A suitable driving means such as the rack 23 may be used to rotate the gear 22. This rack 23, and the rod 24 which is connected to and actuates the plunger 8, may be connected with the same press button 25, so that depression of this button will cause a flow of lubricant from the pump to the distributor and at the same time cause rotation of the disk 13, as a result of which the lubricant passes to the various points where it is needed.

An indicator comprising a scale 26 is provided and as the different markings on the scale pass by a fixed point they will indicate just which point to be lubricated should then be receiving lubricant. This fixed point is diagrammatically indicated on the drawing by the line 27. As set forth above, stopping up of the particular lubrication line will be indicated by much increased effort or even inability to depress further the plunger 8 and rod 24 at any time before it has gone through its maximum movement, while any sudden increased ease of movement will indicate a leak in the line.

The markings on the scale correspond one to each of the different points to be lubricated, and thus a reading of the scale part at the fixed point 27 at the time of sudden increased difficulty or ease of movement of the press button will indicate the lubrication line at fault. This indicator may be otherwise arranged as for example a pointer 26a arranged fast on the shaft 16 and having rotating movement therewith, so that the position of this pointer will indicate the point connected for lubrication at the moment.

The teeth of the gear wheel 22 and rack 23 may always be in mesh with each other so that movement of the button 25 in either direction will cause corresponding movement of the disk 13; or if desired, the gear teeth may be so shaped that they will ride over each other on retraction or upward movement of the button 25, and mesh with each other on downward movement of such button, so that the disk 13 will be rotated on downward movement of the button, but not on upward movement thereof. A spring 28 may be provided to permit the rack 23 to swing to the right as on Fig. 1 so that the teeth on such rack may slide over the teeth on the gear wheel 22 on upward movement of the rack, and in such case the top of the rack may be pivoted at 29 in a slot 30 in the button 25, and a slot 31 may be provided in the reinforcing arm 32 if such arm be used. A spring 33 about the rod 24 and compressed between arm 31 and another point such as the top of the pump 4, may be used in case it is desired to have the button 25 return automatically to operative position. If such spring 33 is used, operation of the device requires only that the button 25 be pushed downwardly as shown on the drawing, whereupon the lubricant in the pump 4 will be forced to the distributor through the pipe 9 into the grooves 18, 20 and 19 consecutively and distributed from the groove 19 to the various outlets 15, 15a, 15b, 15c, etc.; and since the arcuate length of the groove 19 is preferably just a little greater than the shortest arcuate distance between the nearest parts of any two adjacent openings 15a, 15b, 15c, etc., the lubricant will be expelled from the groove 19 practically to only one of such outlet openings at a time except when the groove 19 is about to leave any one of the openings, for example 15a, and while still supplying lubricant thereto through a passage becoming momentarily more constricted, the groove 19 will approach and begin to supply lubricant to the next outlet opening 15b through a passage becoming momentarily larger as the aforesaid passage becomes smaller. The relationship between the sizes and positions of the openings 15, 15a, 15b, etc., and of the groove 19 can easily be so designed that as the passage made thereby for the lubricant decreases at one opening which the groove 19 is leaving, the passage for the lubricant at the next adjacent opening which the groove 19 is approaching increases to the same extent so that the ease of difficulty of operating the press button 25 will be substantially unaffected by switching the flow of lubricant from one line to another.

The inner faces of the disks 12 and 13 are flat and polished, and during the rotation of one with respect to the other they remain so closely in contact that the lubricant will flow only through the openings as indicated, and through the grooves 18, 20 and 19, without any substantial leakage from between the disks.

Guides 34 may be provided to prevent lateral movement of the rack 23, and such guides may be suitably supported, as on the pump body 4.

A retracting means, such as a spring 33, may be added if desired for the purpose of causing automatic retraction of the press button and charging of the pump. If a retracting means is not used, the press button 25 will be manually retracted, and this is most conveniently done just before the operation of supplying lubricant to the various parts.

By the term "manually operable" as used in the appended claims, I mean operable by some person, as with the hand, foot, or otherwise.

What I claim is:

1. In a lubricating system, a reservoir for lubricant, a series of branch conduits leading to points to be lubricated, means for forcing the lubricant from the reservoir to and through said conduits serially, and means operated by said forcing means while functioning as such to indicate which point to be lubricated has not received sufficient lubricant if and when the forcing means does not force sufficient lubricant to the whole series of points to be lubricated.

2. In a lubricating system, a reservoir for lubricant, a series of branch conduits leading to points to be lubricated, means for forcing the lubricant from the container to and through said conduits serially, and means operated together with said forcing means to indicate which point to be lubricated has not received sufficient lubricant if and when the forcing means stops.

3. In a lubricating system, a reservoir for lubricant, a series of branch conduits leading to points to be lubricated, means for forcing the lubricant from the container to and through said conduits serially, and means operable together with said forcing means to indicate which point to be lubricated has not received sufficient lubricant if and when the forcing means moves more easily than when sufficient lubricant is being forced to the points requiring lubrication.

4. In combination, two disks having flat faces in contact with each other, means for rotating one of said disks relatively to the other on an axis perpendicular to said contacting flat faces, one of said disks having therethrough a series of openings spaced equidistantly from said axis of rotation, the distance between any two next adjacent openings of said series being the same as the distance between any other two next adjacent openings thereof, said disk having another opening therethrough spaced a different distance from said axis of rotation, said other disk having a circular groove, the center of which is said axis of rotation, in the contacting face thereof spaced the same distance from said axis of rotation as the second mentioned opening, said second-mentioned disk having in its contacting face an arcuate groove spaced the same distance from the axis of rotation as the series of first mentioned openings, the arcuate length of said last mentioned groove, taken along an arc having said axis of rotation as the center, being slightly greater than the arcuate distance taken in the same manner between the nearest walls of next adjacent openings of said series, said second-mentioned disk having in its contacting face a groove connecting said two grooves.

5. In combination, two disks having flat faces in contact with each other, means for holding one of said disks fixed, means for rotating the other of said disks on an axis perpendicular to said contacting flat faces, the fixed disk having therethrough a series of openings spaced equidistantly from said axis of rotation, the distance between any two next adjacent openings of said series being the same as the distance between any other two next adjacent openings thereof, said fixed disk having another opening therethrough spaced a different distance from said axis of rotation, said rotatable disk having a circular groove in the contacting face thereof spaced the same distance from the axis of rotation as the second mentioned opening, and an arcuate groove spaced the same distance from the axis of rotation as the series of first mentioned openings, the arcuate length of said last mentioned groove, taken along an arc having said axis of rotation as the center, being slightly greater than the arcuate distance taken in the same manner between the nearest walls of next adjacent openings of said series, said rotatable disk having in its contacting face a groove connecting said two grooves.

6. In a lubricating system for supplying lubricant to a series of points, means to force lubricant serially to said series of points, means to indicate which point should be supplied with lubricant at any particular moment in the course of normal operation, and a means for simultaneously actuating said two means.

7. In a manually operable lubricating system for supplying lubricant to a series of points, means to force lubricant serially to said series of points, means to indicate which point should be supplied with lubricant at any particular moment in the course of normal operation, and a manually operable member for simultaneously actuating said two means whereby the operator, by observing the indicating means while operating the manually operable member, can determine which, if any, line is in abnormal condition and distinguish between types of abnormality thereof.

8. In a lubricating system comprising means for serially supplying lubricant to a series of points operable by a plunger having an unidirectional and continuous dispensing movement, an indicating means operable by said plunger for indicating which point should be supplied with lubricant at any particular moment in the course of normal operation.

9. In a lubricating system comprising means for serially supplying lubricant to a series of points operable by a plunger having an unidirectional and continuous dispensing movement, an indicating means in combination with said plunger for indicating which point should be supplied with lubricant at any particular moment in the course of normal operation.

10. In a lubricating system comprising means for serially supplying lubricant to a series of points operable by a plunger having an unidirectional and continuous dispensing movement, an indicating means comprising a scale and a pointer, one of which moves with said plunger and the other of which is stationary during operation of said plunger, whereby said scale and pointer will indicate which point should be supplied with lubricant at any particular moment during normal operation.

11. In a lubricating system for supplying lubricant serially to a series of points, a multiway valve, conduits leading from the ways of the valve to the points to be lubricated, an indicating means to indicate which way of the valve is open, and means concurrently to actuate serially said multiway valve and said indicating means to indicate which way of the valve is open.

12. In a lubricating system for supplying lubricant to a series of points, a container for lubricant, a multiway valve, conduits leading from the ways of the valve to the points to be lubricated, an indicating means to indicate which way of the valve is open, and a movable means simultaneously to force lubricant serially to and through said multiway valve and to actuate serially said multiway valve and said indicating means.

13. In a lubricating system for supplying lubricant to a series of points, a container for lubricant, a multiway valve, conduits leading from the ways of the valve to the points to be lubricated, an indicating means to indicate which way of the valve is open, and means operable by a simple single motion thereof to actuate serially said multiway valve and said indicating means and simultaneously to force lubricant serially to and through said conduits.

14. In a lubricating system for supplying lubricant to a series of points, a container for lubricant, a multiway valve, conduits leading from the ways of the valve to the points to be lubricated, a lubricant propelling means to propel lubricant to and through said multiway valve, an indicating means to indicate which way of the valve is open, and a manually operable single actuating member for simultaneously actuating said multiway valve, said indicating means, and said propelling means to force lubricant serially to the points to be lubricated.

15. In a lubricating system for supplying lubricant serially to a series of points, a multiway valve, conduits leading from the ways of the valve to the points to be lubricated, an indicating means to indicate which way of the valve is open, and a means movable rectilinearly to actuate serially said multiway valve and said indicating means to indicate which way of the valve is open, by rectilinear motion of said movable means.

16. In a lubricating system for supplying lubricant to a series of points, a container for lubricant, a multiway valve, conduits leading from the ways of the valve to the points to be lubricated, a lubricant propelling means to propel lubricant to and through said multiway valve, an indicating means for indicating which way of the valve is open, and a manually operable single actuating member for actuating said multiway valve, said indicating means, and said propelling means to force lubricant serially to the points to be lubricated by the same actuating movement of said actuating member or means.

17. In a manually operable lubricating system for supplying lubricant to a series of points, a multiway valve, conduits leading from the ways of the valve to the points to be lubricated, a means for forcing lubricant to and through said multiway valve, and an indicator visible from the point of operation to indicate which way of the valve is open, a manually movable member for simultaneously actuating said lubricant forming means, said multiway valve, and said indicator, whereby the operator is enabled to fed lubricant to a series of points to be lubricated by one motion of the manually movable member under normal conditions of the lubricating system, and whereby the operator, by a glance at the indicating means while moving the movable means, can determine which line may be partially or wholly inoperative under abnormal conditions of the lubricating system.

18. In a manually operable lubricating system for supplying lubricant to a series of points, a multiway valve, conduits leading from the ways of the valve to the points to be lubricated, means for forcing lubricant to and through said multiway valve, an indicator visible from the point of operation to indicate which way of the valve is open, a manual reciprocable single member for simultaneously actuating said valve, forcing means and indicator when said reciprocable member is moved in one direction, to force lubricant to the points to be lubricated, and which is inoperative to force lubricant to such points when said reciprocable member is moved in another direction, whereby the operator is enabled to feed lubricant to a series of points to be lubricated by said first mentioned motion of said reciprocable member, and whereby the operator, by a glance at the indicator while moving said reciprocable member in said first mentioned direction, can determine which line may be in abnormal condition and distinguish between types of abnormality.

HERBERT B. MOSES.

CERTIFICATE OF CORRECTION.

Patent No. 1,886,067.    November 1, 1932.

HERBERT B. MOSES.

It is hereby certified that error appears in the printed specification of the above numbered patent requiring correction as follows: Page 4, line 6, for "of" first occurrence read "or"; page 5, line 125, claim 17, for "forming" read "forcing"; and that the said Letters Patent should be read with these corrections therein that the same may conform to the record of the case in the Patent Office.

Signed and sealed this 28th day of February, A. D. 1933.

M. J. Moore,
Acting Commissioner of Patents.

(Seal)